(12) United States Patent
Costa

(10) Patent No.: US 10,724,403 B2
(45) Date of Patent: Jul. 28, 2020

(54) FAN CASE ASSEMBLY FOR GAS TURBINE ENGINE

(71) Applicant: United Technologies Corporation, Farmington, CT (US)

(72) Inventor: Mark W. Costa, Storrs, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 55 days.

(21) Appl. No.: 16/036,513

(22) Filed: Jul. 16, 2018

(65) Prior Publication Data

US 2020/0018185 A1 Jan. 16, 2020

(51) Int. Cl.
| | |
|---|---|
| *F01D 11/12* | (2006.01) |
| *F01D 25/24* | (2006.01) |
| *F04D 29/52* | (2006.01) |
| *F01D 11/08* | (2006.01) |
| *F01D 21/04* | (2006.01) |

(52) U.S. Cl.
CPC .............. *F01D 25/24* (2013.01); *F01D 11/08* (2013.01); *F01D 11/12* (2013.01); *F01D 11/122* (2013.01); *F01D 11/125* (2013.01); *F01D 11/127* (2013.01); *F04D 29/526* (2013.01); *F01D 21/045* (2013.01); *F05D 2220/36* (2013.01); *F05D 2240/11* (2013.01); *F05D 2250/283* (2013.01)

(58) Field of Classification Search
CPC ........ F04D 29/526; F01D 11/08; F01D 11/12; F01D 11/122; F01D 11/125; F01D 11/127
See application file for complete search history.

(56) References Cited

U.S. PATENT DOCUMENTS

| | | | | |
|---|---|---|---|---|
| 5,431,532 A | * | 7/1995 | Humke | F01D 21/045 415/9 |
| 5,516,257 A | * | 5/1996 | Kasprow | F01D 21/045 415/200 |
| 5,823,739 A | * | 10/1998 | Van Duyn | F01D 21/045 415/9 |
| 6,120,242 A | * | 9/2000 | Bonnoitt | F01D 21/045 415/174.4 |
| 6,146,089 A | * | 11/2000 | Allen | F01D 11/12 415/173.4 |
| 2004/0022625 A1 | * | 2/2004 | Care | F01D 11/122 415/173.3 |

(Continued)

FOREIGN PATENT DOCUMENTS

| | | |
|---|---|---|
| DE | 102011077620 A1 | 12/2012 |
| EP | 2230387 A2 | 9/2010 |

(Continued)

OTHER PUBLICATIONS

European Search Report for Application No. EP 19 18 6602.
English Machine Translation to Abstract DE102011077620.

*Primary Examiner* — Kenneth J Hansen
*Assistant Examiner* — Andrew J Marien
(74) *Attorney, Agent, or Firm* — Cantor Colburn LLP

(57) ABSTRACT

A fan case assembly for a gas turbine engine includes a honeycomb structure. The fan case assembly also includes a septum operatively coupled to the honeycomb structure and located radially inward of the honeycomb structure. The fan case assembly further includes a rubstrip in contact with the septum and located radially inward of the septum.

16 Claims, 3 Drawing Sheets

(56) References Cited

U.S. PATENT DOCUMENTS

| | | | | |
|---|---|---|---|---|
| 2009/0155044 A1* | 6/2009 | Xie | ............. | B29C 70/086 |
| | | | | 415/9 |
| 2011/0286839 A1* | 11/2011 | Wojtyczka | ............. | F01D 21/045 |
| | | | | 415/173.4 |
| 2013/0195605 A1* | 8/2013 | Robertson | ............. | F01D 11/125 |
| | | | | 415/1 |
| 2014/0064938 A1 | 3/2014 | Ericksen et al. | | |
| 2014/0271157 A1* | 9/2014 | Harper | ............. | F04D 17/00 |
| | | | | 415/186 |
| 2019/0136871 A1* | 5/2019 | Cheung | ............. | F04D 29/526 |

FOREIGN PATENT DOCUMENTS

| | | | |
|---|---|---|---|
| EP | 2623723 | A2 | 8/2013 |
| EP | 2711556 | A2 | 3/2014 |
| EP | 2952696 | A1 | 12/2015 |
| GB | 2061397 | A | 5/1981 |

* cited by examiner

FAN CASE ASSEMBLY FOR GAS TURBINE ENGINE

BACKGROUND

Exemplary embodiments pertain to the art of gas turbine engines and, more particularly, to a fan case assembly for gas turbine engines.

A turbofan engine typically includes a fan, a booster, a high pressure compressor, a combustor, a high pressure turbine, and a low pressure turbine in serial axial flow relationship about a longitudinal centerline axis of the engine. The high pressure turbine is drivingly connected to the high pressure compressor via a first rotor shaft, and the low pressure turbine is drivingly connected to both the fan and booster via a second rotor shaft. The fan includes an annular disk and a plurality of radially extending blades mounted to the disk, where the disk and the blades are rotatable about the longitudinal centerline of the engine. Such fans are surrounded by a fan case which is specifically designed to be capable of containing a fan blade in the event that the fan blade is released from its disk during operation. This prevents or minimizes the structural damage to the engine and aircraft should one or more fan blades be released from the disk due to a failure of one or more blades, ingestion of debris, or other cause.

The fan case also serves as the outer flowpath boundary through the fan rotor and closely circumscribes the tips of the fan blades in order to minimize leakage past the fan blades. Prior fan cases are typically lined with a sacrificial abradable material in order to protect the fan blades during contact between the fan blades and the fan case (referred to as "rub"). While sacrificial wearing away of the abradable material prevents damage to costly fan blades, it also opens up the radial clearance at the blade tips, resulting in loss of engine thrust.

Current fan case rubstrip systems experience a significant amount of erosion during a prolonged period of icing. This shed ice erosion, combined with fan rotor unbalance and whirl, extends through the abradable, a septum and into the supporting structural honeycomb. In addition to the economic damage to the fan case, the eroded rubstrip allows, combined with rotor unbalance from shed ice, contribute to large fan whirl orbit. This orbit is large enough to wear the abradable in the low pressure compressor beyond allowable operational limits.

BRIEF DESCRIPTION

Disclosed is a fan case assembly for a gas turbine engine including a honeycomb structure. The fan case assembly also includes a septum operatively coupled to the honeycomb structure and located radially inward of the honeycomb structure. The fan case assembly further includes a rubstrip in contact with the septum and located radially inward of the septum.

In addition to one or more of the features described above, or as an alternative, further embodiments may include that the rubstrip has a uniform circular inner surface for interaction with a rotatable fan blade located within the fan case assembly.

In addition to one or more of the features described above, or as an alternative, further embodiments may include that the rubstrip includes a first axial section, a second axial section, and a third axial section, the first axial section and the third axial section having a radial thickness greater than a radial thickness of the second axial section, the second axial section positioned for contact with an outer tip of a rotatable fan blade located within the fan case assembly.

In addition to one or more of the features described above, or as an alternative, further embodiments may include that the septum includes a bumper portion having a radial thickness greater than a radial thickness of other portions of the septum.

In addition to one or more of the features described above, or as an alternative, further embodiments may include that the bumper portion is axially aligned with the second axial section of the rubstrip.

In addition to one or more of the features described above, or as an alternative, further embodiments may include that the bumper portion defines at least one circumferentially extending slot.

In addition to one or more of the features described above, or as an alternative, further embodiments may include that the rubstrip includes at least one protrusion extending radially outward from the second axial section of the rubstrip, the at least one protrusion filling the at least one circumferentially extending slot of the bumper portion.

In addition to one or more of the features described above, or as an alternative, further embodiments may include that axial ends of the first axial section and the third axial section of the rubstrip are angled, the angled ends corresponding to angled faces of the septum.

In addition to one or more of the features described above, or as an alternative, further embodiments may include that the rubstrip is at least partially formed with an aramid polymer.

In addition to one or more of the features described above, or as an alternative, further embodiments may include that the septum is at least partially formed with a synthetic fiber material.

Also disclosed is a gas turbine engine including a compressor section, a combustor section, a turbine section, and a fan section comprising a plurality of fan blades circumferentially spaced from each other and rotatable about an axis. Also included is a fan case assembly including a honeycomb structure. The fan case assembly also includes a septum operatively coupled to the honeycomb structure and located radially inward of the honeycomb structure, the septum including a bumper portion having a radial thickness greater than a radial thickness of other portions of the septum. The fan case assembly further includes a rubstrip in contact with the septum and located radially inward of the septum, the rubstrip including a first axial section, a second axial section, and a third axial section, the first axial section and the third axial section having a radial thickness greater than a radial thickness of the second axial section, the second axial section positioned for contact with an outer tip of each of the fan blades.

In addition to one or more of the features described above, or as an alternative, further embodiments may include that the bumper portion is axially aligned with the second axial section of the rubstrip.

In addition to one or more of the features described above, or as an alternative, further embodiments may include that the bumper portion defines at least one circumferentially extending slot.

In addition to one or more of the features described above, or as an alternative, further embodiments may include that the rubstrip includes at least one protrusion extending radially outward from the second axial section of the rubstrip, the at least one protrusion filling the at least one circumferentially extending slot of the bumper portion.

In addition to one or more of the features described above, or as an alternative, further embodiments may include that axial ends of the first axial section and the third axial section of the rubstrip are angled, the angled ends corresponding to angled faces of the septum.

In addition to one or more of the features described above, or as an alternative, further embodiments may include that the rubstrip is at least partially formed with an aramid polymer.

In addition to one or more of the features described above, or as an alternative, further embodiments may include that the septum is at least partially formed with a synthetic fiber material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
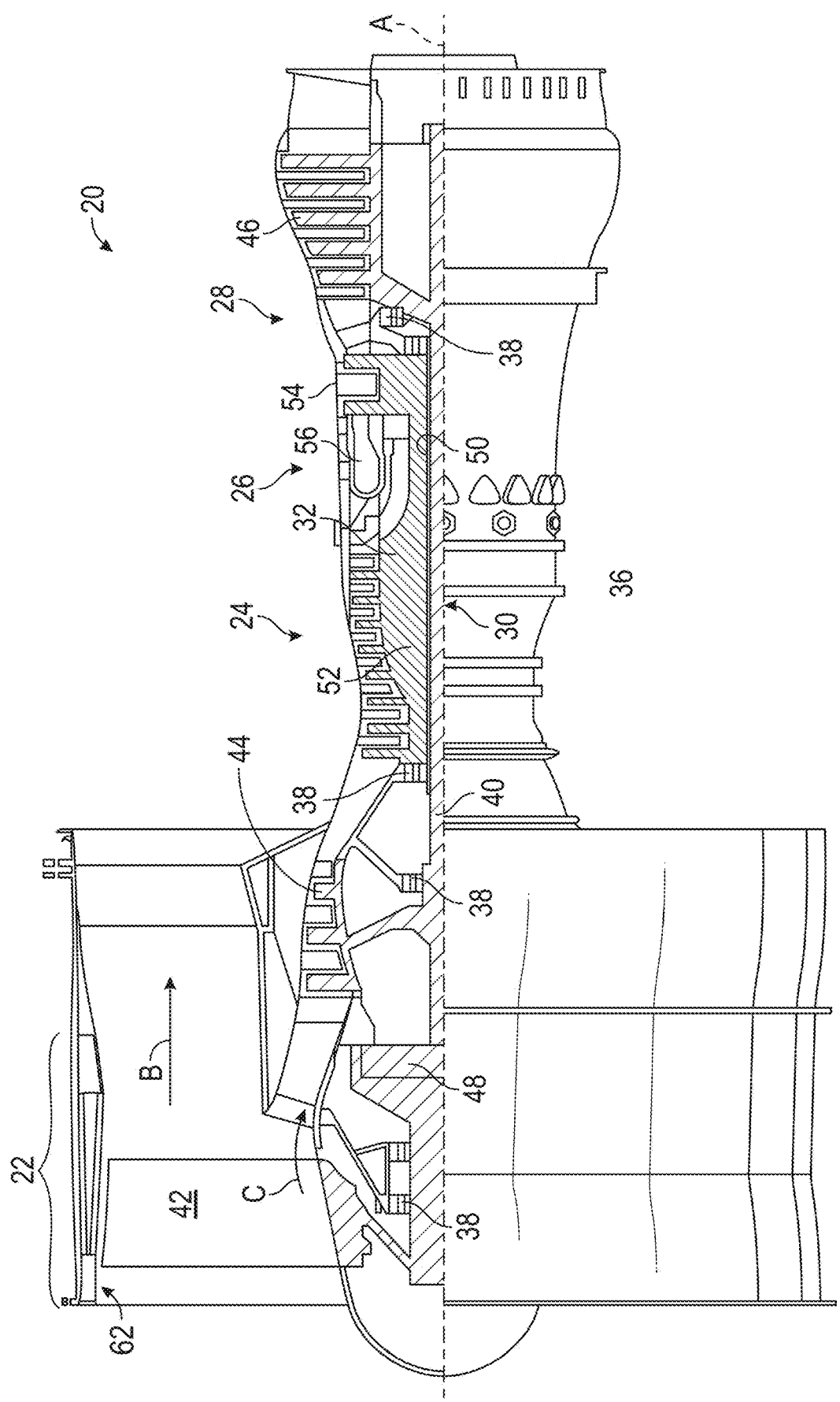
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
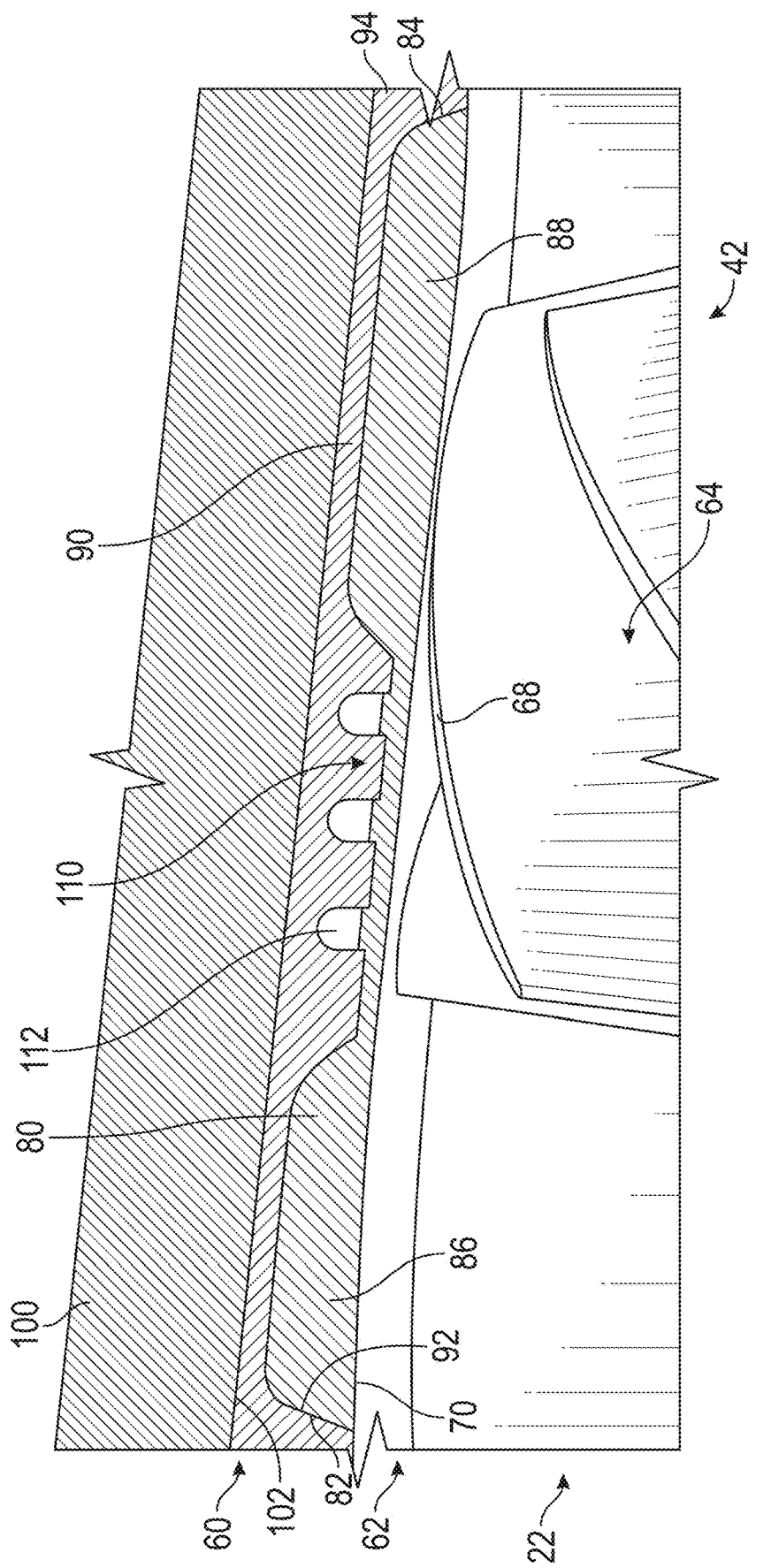
FIG. 2 is a partial cross-sectional view of a fan case assembly.

Referring to FIG. 2, a portion of the fan section 22 of the gas turbine engine is illustrated in greater detail. In particular, a portion of a fan case assembly 60 that is located at a radially outer portion 62 (FIGS. 1 and 2) of the fan 42 is shown. The fan case assembly 60 surrounds a plurality of fan blades circumferentially spaced from each other. The sectional image shows a single fan blade 64 for purposes of illustration. The fan case assembly 60 defines an outer portion of a flow path and a space for the fan blade 64 to rotate within. The radial clearance between an outer tip 68 of the fan blade 64 and a radially inner surface 70 of the fan case assembly 60 is to be minimized, as the clearance allows flow leakage therethrough, resulting in a less efficient overall system.

The fan case assembly 60 includes a rubstrip 80 that extends axially from a front end 82 to an aft end 84, as well as circumferentially along a fan blade tip path. The rubstrip 80 is formed of a uniform abradable material along an entire fan blade interface which is defined as a contact region between the blade tip 68 and the rubstrip 80. The rubstrip 80 material is intended to wear away during contact with the blade tip 68. For example, the rubstrip 80 may be formed of an aramid polymer in some embodiments. Contact between the rubstrip 80 and the blade tip 68 can occur in normal flight operations such as takeoff, landing, cross wind condition and to a greater extent due to fan rotor unbalance during certain operating conditions. Additionally, during icing conditions, ice shedding occurs, whereby pieces of ice are projectiles that contact the rubstrip 80. Either blade tip contact or ice shedding leads to erosion of the rubstrip 80.

The fan case assembly 60 also includes a septum 90 disposed radially outward of the rubstrip 80. The septum 90 is operatively coupled to an inner surface of a honeycomb structure 100 that is part of the fan case assembly 60. The septum 90 serves as a buffer between the rubstrip 80 and the honeycomb structure 100, thereby protecting the underlying honeycomb structure 100 in the event the rubstrip 80 is completely eroded in a certain area. The septum 90 protects the honeycomb structure 100 due to the material of the septum 90. In particular, the septum 90 is formed of a durable synthetic fiber material, such as Kevlar®, for example. In some embodiments, resin injected molded segments of chopped Kevlar® are supported on an inner surface 102 of the honeycomb structure 100.

The septum 90 includes a bumper portion 110 that is integrally formed with the septum 90. In other words, the bumper portion 110 and the overall septum 90 is a single, unitary structure. The bumper portion 110 is a thicker portion of the septum 90, relative to the radial thickness of the septum 90. The bumper portion 110 is aligned with a contact interface portion of the rubstrip 80. The bumper portion 110 is positioned and constructed to restrict additional whirl and minimize interaction between the fan blade tip 68 and the bumper portion 110.

Additional areas of concern are forward and aft of the bumper portion 110. These areas may be subjected to ice shedding, as described above. To resist ice shedding in these regions, one or both regions (i.e., forward and aft) may have a thickened portion of the rubstrip 80. For example, a forward thickened portion 86 and an aft thickened portion 88 of the rubstrip 80 may be provided. The thickened portion(s) refer to a radial thickness of the rubstrip 80. Therefore, the thickened portions 86, 88 of the rubstrip 80 have a radial thickness that is greater than the radial thickness of the portion of the rubstrip 80 that is in contact with the bumper portion 110 of the septum 90. The forward thickened portion 86 may be referred to herein as a first axial section of the rubstrip 80; the section of the rubstrip 80 located between the forward thickened portion 86 and the aft thickened portion 88 may be referred to herein as a second axial section of the rubstrip 80; and the aft thickened portion 88 may be referred to herein as a third axial section of the rubstrip 80.

In some embodiments, one or both of the thickened portions 86, 88 do not extend to the forward end or aft end of the septum 90, as in the case of the illustrated embodiment. In such embodiments, the septum 90 includes an angled forward end 92 and an angled aft end 94, with the thickened portions 86, 88 positioned within the angled ends 92, 94. In other words, angled ends 92, 94 substantially correspond to axial ends of the thickened portions 86, 88 of the rubstrip.

The thickened angled surface ends protects the vertical walls of the adjacent honeycomb structure from ice impingement and subsequent erosion.

The angled ends 92, 94 also assist with manufacturing of the septum 90 and/or the rubstrip 80.

As shown in FIG. 2, the bumper portion 110 defines a plurality of circumferentially extending slots 112. Although three slots are illustrated, it is to be understood that more or fewer slots may be employed in some embodiments, such that at least one circumferentially extending slot may be utilized. The slot(s) 112 provide a fan blade operability benefit once the abradable material 80 has been worn or eroded from ice. This configuration is beneficial if abradable 80 has sufficient thickness to not be damaged in normal operation conditions.

Figure 3:
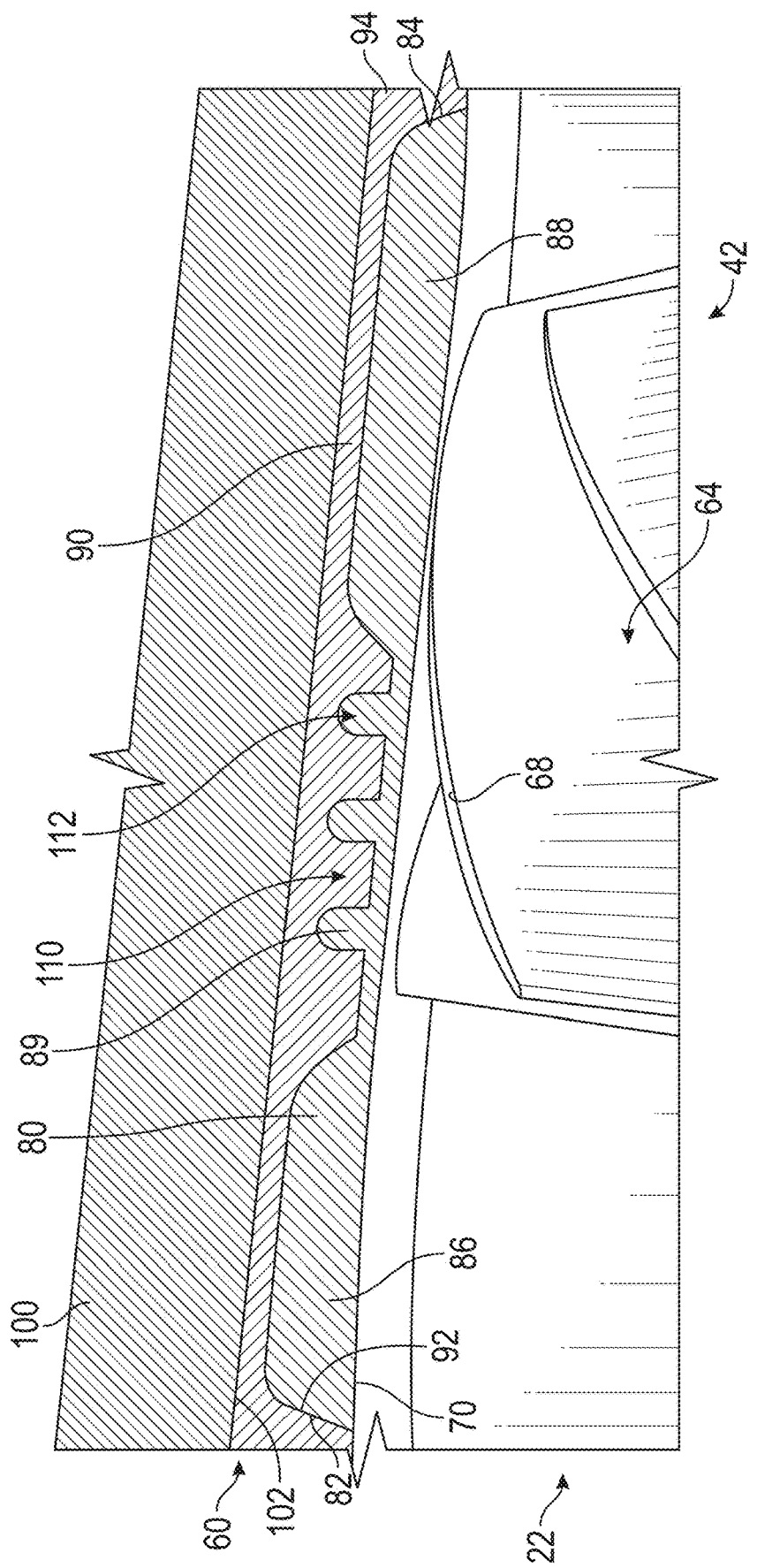
FIG. 3 is a partial cross-sectional view of the fan case assembly according to another aspect of the disclosure.

Referring now to FIG. 3, the fan case assembly 60 is illustrated according to another aspect of the disclosure. The fan case assembly 60 is identical to that described above in conjunction with FIG. 2, however, the rubstrip 80 is shaped to include one or more protrusions 89 extending radially outwardly therefrom. The protrusion(s) 89 are positioned and dimensioned to substantially fill the circumferentially extending slot(s) 112 of the bumper portion 110. This configuration is applicable when there is not a sufficient thickness of abradable material 80 adjacent fan tip 68. The size and spacing of slots 110 allows for a method of adjusting the amount of rub load that the fan blade 64 will experience during the high rotor in-balance and rub.

The embodiments disclosed herein maintain a uniform abradable across the entire fan blade path for performance and constant fan blade-to-fan case interaction.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan case assembly for a gas turbine engine comprising: a honeycomb structure; a septum operatively coupled to the honeycomb structure and located radially inward of the honeycomb structure, the septum having an angled forward end extending radially inward from the honeycomb structure and an angled aft end extending radially inward from the honeycomb structure; and a rubstrip in contact with the septum and located radially inward of the septum, the rubstrip having a first axial section, a second axial section, and a third axial section, the first axial section and the third axial section having a radial thickness greater than a radial thickness of the second axial section, the second axial section positioned for contact with an outer tip of a rotatable fan blade located within the fan case assembly, wherein the first axial section does not extend past the angled forward end of the septum and the third axial section does not extend past the angled aft end of the septum.

2. The fan case assembly of claim 1, wherein the rubstrip has a uniform circular inner surface for interaction with a rotatable fan blade located within the fan case assembly.

3. The fan case assembly of claim 1, wherein the septum includes a bumper portion having a radial thickness greater than a radial thickness of other portions of the septum.

4. The fan case assembly of claim 3, wherein the bumper portion is axially aligned with the second axial section of the rubstrip.

5. The fan case assembly of claim 3, wherein the bumper portion defines at least one circumferentially extending slot.

6. The fan case assembly of claim 5, wherein the rubstrip includes at least one protrusion extending radially outward from the second axial section of the rubstrip, the at least one protrusion filling the at least one circumferentially extending slot of the bumper portion.

7. The fan case assembly of claim 3, wherein axial ends of the first axial section and the third axial section of the rub strip are angled, the angled ends of the first axial section and the third axial section corresponding to the angled forward end and the angled aft end of the septum.

8. The fan case assembly of claim 1, wherein the rubstrip is at least partially formed with an aramid polymer.

9. The fan case assembly of claim 1, wherein the septum is at least partially formed with a synthetic fiber material.

10. A gas turbine engine comprising: a compressor section; a combustor section; a turbine section; a fan section comprising a plurality of fan blades circumferentially spaced from each other and rotatable about an axis; and a fan case assembly comprising: a honeycomb structure; a septum operatively coupled to the honeycomb structure and located radially inward of the honeycomb structure, the septum including a bumper portion having a radial thickness greater than a radial thickness of other portions of the septum, and an angled forward end extending radially inward from the honeycomb structure and an angled aft end extending radially inward from the honeycomb structure; and a rubstrip in contact with the septum and located radially inward of the septum, the rubstrip including a first axial section, a second axial section, and a third axial section, the first axial section and the third axial section having a radial thickness greater than a radial thickness of the second axial section, the second axial section positioned for contact with an outer tip of each of the fan blades, and wherein the first axial section does not extend past the angled forward end of the septum and the third axial section does not extend past the angled aft end of the septum.

11. The gas turbine engine of claim 10, wherein the bumper portion is axially aligned with the second axial section of the rubstrip.

12. The gas turbine engine of claim 11, wherein the bumper portion defines at least one circumferentially extending slot.

13. The gas turbine engine of claim 12, wherein the rubstrip includes at least one protrusion extending radially outward from the second axial section of the rubstrip, the at least one protrusion filling the at least one circumferentially extending slot of the bumper portion.

14. The gas turbine engine of claim 11, wherein axial ends of the first axial section and the third axial section of the rubstrip are angled, the angled ends of the first axial section and the third axial section corresponding to the angled forward end and the angled aft end of the septum.

15. The gas turbine engine of claim 10, wherein the rubstrip is at least partially formed with an aramid polymer.

16. The gas turbine engine of claim 10, wherein the septum is at least partially formed with a synthetic fiber material.

* * * * *